United States Patent
Henderson et al.

(10) Patent No.: US 7,044,154 B2
(45) Date of Patent: May 16, 2006

(54) APPARATUS FOR DETECTING AND PREVENTING FLUID LEAKS IN A PROPERTY

(75) Inventors: Robert D. Henderson, Phoenix, AZ (US); Xan D. Henderson, Mesa, AZ (US); Donald E. Adams, Mesa, AZ (US); Steven A. Bozsi, Peoria, AZ (US)

(73) Assignee: Process Integration, Gilbert, AZ (US)

( * ) Notice: Subject to any disclaimer, the term of this patent is extended or adjusted under 35 U.S.C. 154(b) by 36 days.

(21) Appl. No.: 10/691,834

(22) Filed: Oct. 22, 2003

(65) Prior Publication Data

US 2005/0087230 A1 Apr. 28, 2005

(51) Int. Cl.
*G05D 7/06* (2006.01)

(52) U.S. Cl. .................. 137/312; 137/551; 340/605
(58) Field of Classification Search ............. 340/605, 340/513, 514, 525; 73/40.5 R; 137/312, 551, 137/558; 200/61.04, 61.05; 307/116, 118; 361/178
See application file for complete search history.

(56) References Cited

U.S. PATENT DOCUMENTS

| 4,297,686 A | * | 10/1981 | Tom | 340/605 |
| 4,324,268 A | * | 4/1982 | Jacobson | 137/312 |
| 5,240,022 A | * | 8/1993 | Franklin | 137/312 |
| 5,655,561 A | * | 8/1997 | Wendel et al. | 137/312 |
| 5,967,171 A | * | 10/1999 | Dwyer, Jr. | 137/312 |
| 6,147,613 A | * | 11/2000 | Doumit | 340/605 |
| 6,157,307 A | * | 12/2000 | Hardin | 340/605 |
| 6,170,798 B1 | * | 1/2001 | Johnson et al. | 137/312 |
| 6,186,162 B1 | * | 2/2001 | Purvis et al. | 137/312 |
| 6,489,895 B1 | * | 12/2002 | Apelman | 340/605 |
| 6,526,807 B1 | * | 3/2003 | Doumit et al. | 73/40.5 R |
| 6,662,821 B1 | * | 12/2003 | Jacobsen et al. | 137/312 |
| 6,731,215 B1 | * | 5/2004 | Harms et al. | 340/605 |

* cited by examiner

*Primary Examiner*—Kevin Lee
(74) *Attorney, Agent, or Firm*—Stewart J. Womack

(57) ABSTRACT

The invention is a detection and prevention system to detect and prevent fluid leaks in a property that may cause damage to the property. The sources of the leaks may include, for example, toilets, hot water heater, sinks, washing machines, water makers and broken pipes or other sources of fluid leaks. The inventive may include one or more sender units that may be positioned at various locations on a property. The sender units may have a fluid sensor (for detecting a fluid leak) and a transmitter (for communicating with a base unit). The base unit may receive signals from the transmitter when the fluid sensors detect a fluid. The base unit may then communicate with a main shut off valve to restrict the flow of fluids onto the property.

17 Claims, 5 Drawing Sheets

APPARATUS FOR DETECTING AND PREVENTING FLUID LEAKS IN A PROPERTY

FIELD OF THE INVENTION

The invention relates to systems and processes for automatically detecting and stopping fluid leaks on a property. The invention stops the fluid (typically water) related damage that is caused by undetected leaks throughout a property from sources such as toilets, hot water heaters, sinks, washing machines, water makers and broken pipes.

BACKGROUND OF THE INVENTION

Water detection systems are known and have been in use for many years. Typically, water detection systems include a water sensor unit that is hard wired to a security system or as a stand alone system that gives a visible or audible alarm only. These systems may detect and stop leaks that come from toilets, hot water heaters, sinks, washing machines, water makers and broken pipes and other potential fluid leak sites.

The main problem with conventional water detection systems is that they are generally hard wired products that are expensive and difficult to install within existing properties. Routing hard wires within an existing property typically requires either leaving the wires in an exposed and visible condition or running the wires through walls and above ceilings. Exposed and visible wires create their own safety problems and running wires through walls or above ceilings tends to be difficult and expensive.

Another problem with conventional water detection systems is that existing products can shut of individual valves on washing machines, sinks or the like, but not the main fluid valve. This approach requires a shut off valves for every possible fluid leak source thereby increasing the cost of the system. In addition, if the detected fluid came from a fluid source other than the predicted fluid source, then the wrong shut off valve may be activated thereby allowing the leak to continue to cause damage on the property.

Another problem with conventional water detection systems is that they do not easily indicate where the leak was detected. This can cause delays in locating and fixing the leak on the property thereby possibly allowing additional damage to occur.

Applicants have therefore noticed that there is a need for a system that is easy and inexpensive to install (even on existing properties), is capable of reliably removing the source of the fluid for a leak and assists in determining the location of the leak.

SUMMARY OF THE INVENTION

In view of the foregoing disadvantages inherent in the known types of water detection systems in the prior art, the invention provides a new apparatus for detecting and stopping fluid leaks in a property. The system may be utilized for the reduction of fluid related damage that is caused by undetected leaks throughout a property from sources such as toilets, hot water heater, sinks, washing machines, water makers, broken pipes or other uncontained fluid sources.

An object of the invention is to provide a fluid detection and prevention system to prevent floods in properties that will overcome one or more of the shortcomings of the prior art devices.

Another object is to provide a fluid detection and prevention system to prevent floods in properties thereby reducing fluid related damage caused by undetected leaks throughout a property from sources such as toilets, hot water heater, sinks, washing machines, water makers and broken pipes.

Another object is to provide a fluid detection and prevention system to prevent floods in properties that can be easily installed in existing housing or properties to shut off water in case of a leak.

Another object is to provide a fluid detection and prevention system to prevent fluid damage in properties that may have a base unit that can receive RF signals from one or more sender units located at one or more potential fluid leakage sites.

Another object is to provide a fluid detection and prevention system to prevent fluid damage in properties wherein the base unit and shut off valve are in communication via RF signals at established frequencies approved by the Federal Communications Commission.

Another object is to provide a fluid detection and prevention system to prevent fluid damage in properties that has the ability to distinguish between one or more sender units so that a base unit may display where a leak has occurred.

Another object is to provide a fluid detection and prevention system to prevent fluid damage in a property that has the ability to shut off by means of an electronic solenoid valve, whether internally or externally activated, or other motorized driven systems that will mechanically shut off the fluid coming into the property from the main supply line into the property.

Another object is to provide a fluid detection and prevention system to prevent fluid damage in properties wherein a base unit may activate an automatic shut off valve using a 12 or 24 VAC electrical system for improved reliability and safety.

Another object is to provide a fluid detection and prevention system to prevent fluid damage in properties where a fluid sensor will be battery operated, preferably with a 9 volt battery, to increase the life of the fluid sensor between battery changes.

Another object is to provide 24 hour constant monitoring with automatic shut off of a main shut off valve in case no occupant is available when a leak is detected.

Other objects and advantages of the present invention will become obvious to the reader and it is intended that these objects and advantages are within the scope of the present invention.

The general purpose of the present invention, which will be described subsequently in greater detail, is to provide a new fluid detection and prevention system. The invention may include one or more sender units, a base unit and a main shut off valve.

The sender units may transmit an RF signals to a base unit. The base unit may transmit an RF signal to a main shut off valve to prevent fluid damage to a property. The system may have many of the advantages of the fluid detection and prevention systems previously mentioned.

To attain the desire objectives, the present invention includes one or more sender units which preferably include a fluid sensor and a transmitter. The fluid sensor may be include conductive contact points that measures the resistivity or continuity changes when fluid is present between the conductive contact points. The fluid sensor may be an integral part of a sender unit. The transmitter portion of a sender unit may be a radio frequency device operating within approved FCC bandwidths that may send a signal when fluid is detected by the fluid sensor to the base unit.

The base unit may run on 12 or 24 volts alternating current (VAC). The base unit may receive the RF signal from a transmitter portion of one of the sender units when fluid is detected by the fluid sensor of a sender unit and then the base unit activates a main shut off valve or other shut-off device on the main incoming fluid line. This stops the flow of fluid to the property thereby reducing or eliminating fluid damage to the property. The base unit may include a main control system that includes circuits and other electronic components to read signal sent from a sending unit and that also activates the automatic shut of valve with internal solenoid external solenoid or motorized mechanical shut off on the fluid main. The base unit may also include a plurality of LED's for communicating the status of the invention to the user. For example, the base unit may include multicolored LEDs that emit red to indicate that its corresponding sender unit has detected a leak, green to indicate normal operation of its sender unit with no leaks, and yellow to indicate a low battery or a test condition for its sender unit.

There has thus been outlined, rather broadly, the features of the invention in order that the detailed description thereof may be better understood, and in order that the present contribution to the art may be better appreciated. There are additional features of the invention that will be described hereinafter.

To the accomplishment of the above and related objects, this invention may be embodied in the form illustrated in the accompanying drawings, attention being called to the fact, however, that the drawings are illustrative only, and that changes may be made in the specific construction illustrated.

DETAILED DESCRIPTION OF THE PREFERRED EMBODIMENTS

Figure 1A:
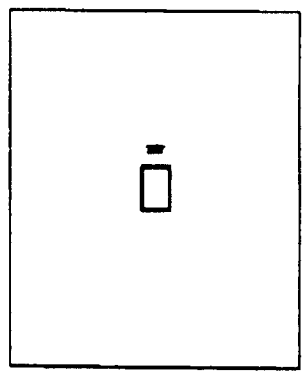
FIG. 1a illustrates a top view of a sender unit.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

Overview

Figure 5:
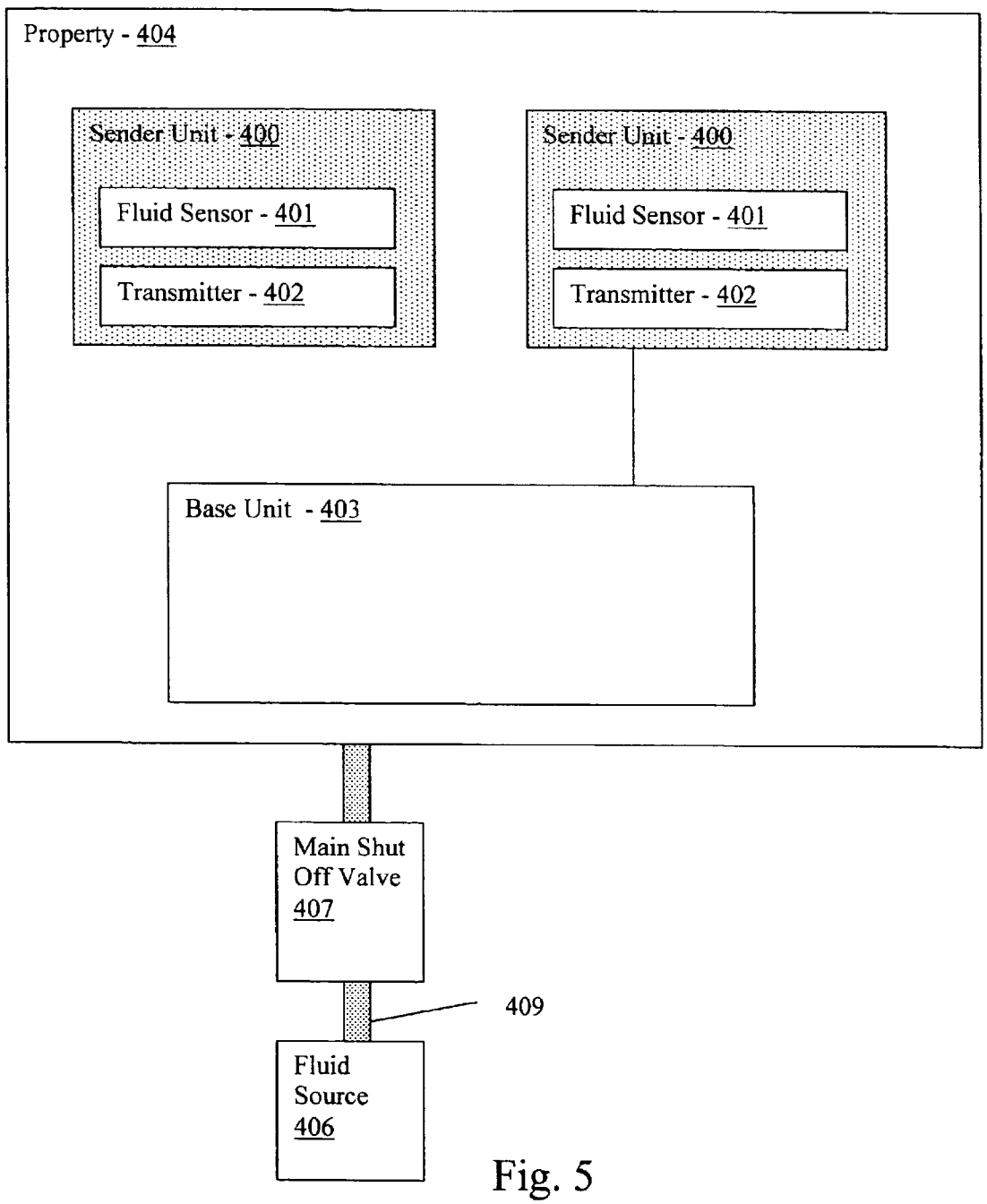
FIG. 5 is a drawing illustrating the connections between the various parts of the invention.

The overall purpose and function of the invention will now be disclosed with reference to FIG. 5. The invention may be used to detect and stop fluid leaks on a property 404 that might otherwise cause fluid damage to the property 404 or to individuals on the property 404. The disclosed detection and prevention system is inexpensive and easy to install (even in existing properties), may be used to simultaneously monitor multiple possible leak locations on a property 404, will reliably stop a fluid leak once detected and may assist in locating the source of the fluid leak. The invention includes one or more sender units 400, a base unit 403 and a main shut off valve 407. The sender units 400 may advantageously be positioned throughout the property at locations that are likely to experience a fluid leak. Once a sender unit 400 detects a fluid leak it may communicate this information to the base unit 403. The base unit 403 may then display the location of the sender unit 400 (and therefore the location of the fluid leak) via the use of LEDs and the base unit 403 may also communicate a command to a main shut off valve 407 to restrict the flow of fluids onto the property 404 from a fluid source 406.

Sender Unit—400

The invention may include one or more sender units 400 that continuously monitor for fluid leaks. The sender units 400 are preferably small and easily moveable electronic device that will typically include a fluid sensor 401 and a transmitter 402. To facilitate their ease in placement in various locations on a property 404, the sender units 400 are preferably powered by batteries.

Fluid Sensor—401

Figure 1B:
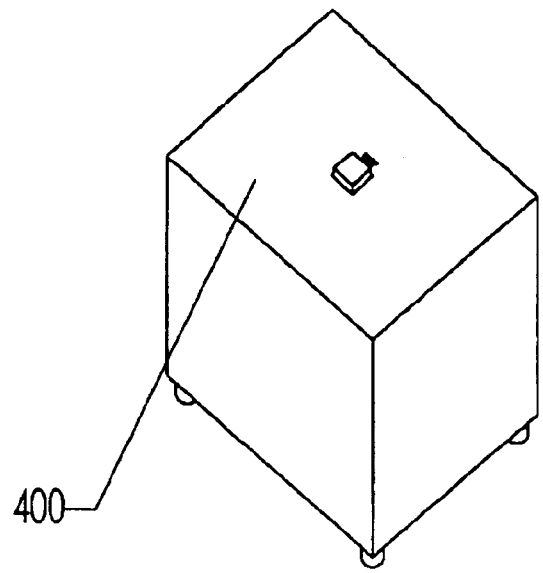
FIG. 1b illustrates a perspective view of a sender unit.
Figure 1C:
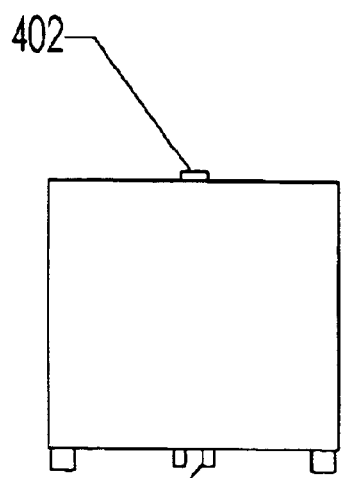
FIG. 1c illustrates a side view of a sender unit.
Figure 1D:
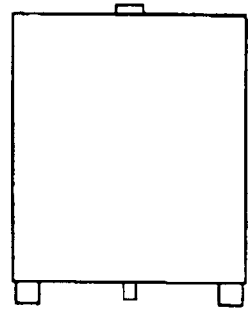
FIG. 1d illustrates another side view of a sender unit.

FIG. 1a illustrates a top view, FIG. 1b illustrates a perspective view, FIGS. 1c and 1d illustrate different side views of an exemplary sender unit 400. The fluid sensor 401 may use any number of known techniques for detection of a fluid. In a preferred method, the fluid sensor 401 uses conductive wires (best seen in FIG. 1c) that may have a voltage drop, for example up to 2 volts, between them. When fluid is present between the wires the resistivity or continuity changes and this change is detected and activates a switch signaling that the resistance or continuity has changed. A sealed plastic outer case may be used to house the working electronic devices within the fluid sensor 401. The conductive wires are advantageously positioned through the bottom of the case and are exposed facing downward toward the floor or other area to facilitate the sensing of fluids.

Transmitter—402

The sender units 400 may be constructed in such a way as to detect the changes in resistivity or continuity from the conductive wires that make up the fluid sensor 401. It is this change in resistivity or continuity, due to the presence of a fluid between the wires, that may be used to activate the electronics in the sender unit 400, i.e. transmitter 402, to respond with a signal that is transmitted using an RF electronic chip or circuit at a desired frequency to the base unit 403. It is very desirable for each transmitter 402 to use a unique identifier as part of the RF signal so that the base unit 403 may easily tell which of its sender units 400 made the transmission. This allows the base unit 403 to determine the location of the fluid leak on the property 404. The ability of the RF signal to penetrate walls and other structures makes it ideal for eliminating the need for individual wiring from the sender units 400 to the base unit 403.

The power level of the transmitters 402 may be made to be adjustable. This allows the transmitters 402 to use a less powerful RF signal on smaller properties 404 or a more powerful RF signal on larger properties 404.

Base Unit—403

Figure 2:
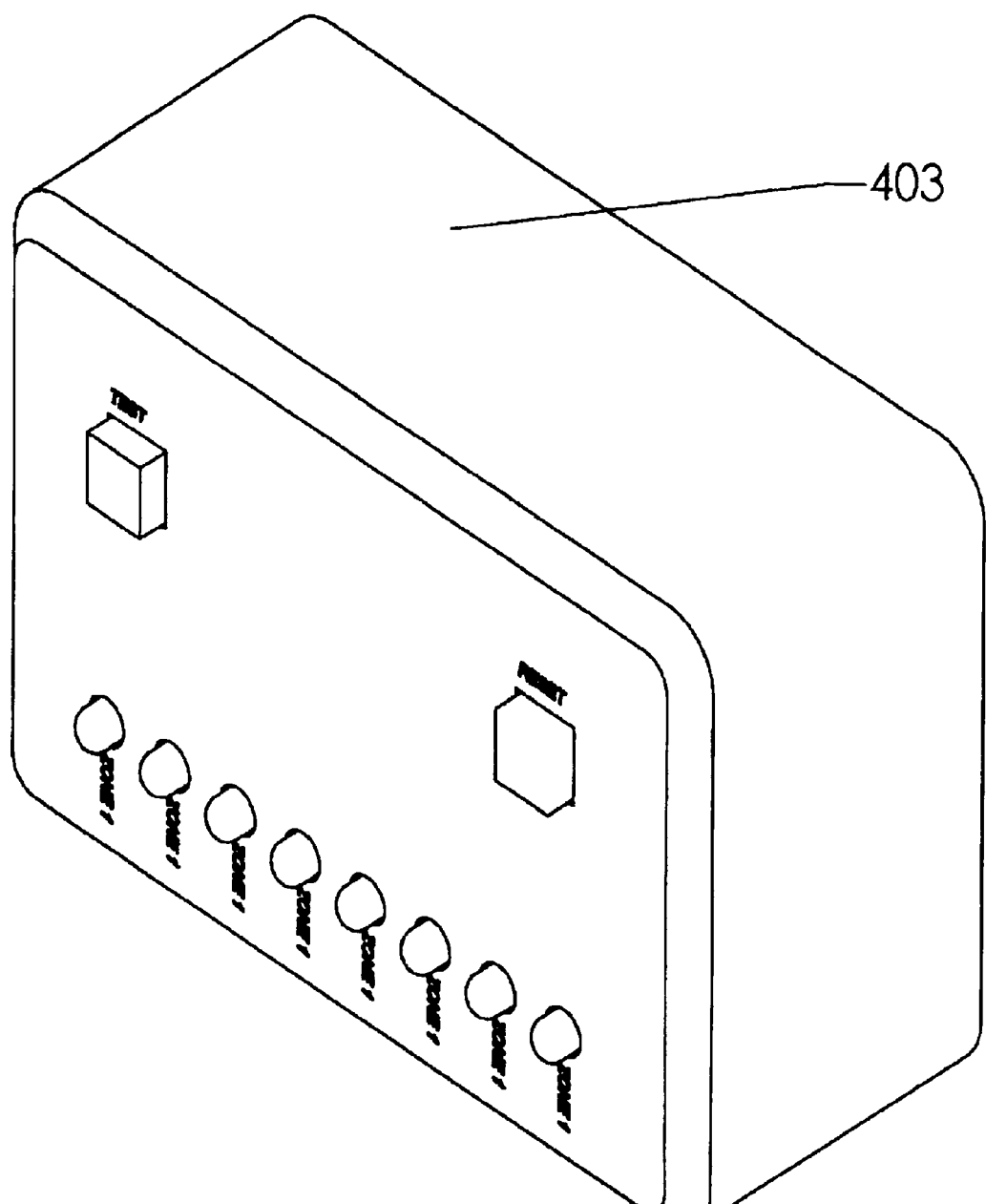
FIG. 2 is a drawing of a base unit.

The base unit 403, an exemplary one is illustrated in FIG. 2, may operate as the main control system that includes circuits and other electronic components to read signals from the one or more sender units 400. Once a signal from a sender unit 400 indicating a leak is detected, the base unit 403 may send a signal to a solenoid valve 407 that may be installed on an incoming water line. The solenoid valve may have a plunger that once activated will close the valve automatically stopping the flow of fluids through the main water supply line. The base unit 403 preferably runs off a 12 or 24 VAC power supply, but as is known in the art, may be powered by other electrical sources.

The base unit 403 may also include test functions to measure the amount of power the sender units 400 have left before their batteries need to be changed. The base unit 403 may activate a test scheme to read the signals from each individual sender unit 400 to determine the life of the battery that operates the sender unit 400. If the signal is too weak the base unit 403 may use a light emitting diode (LED) to indicate the need for new batteries or other maintenance required on one of the sender units 400.

The base unit 403 may also feature the ability to shut off the main water without physically moving a valve on the main water line. The base unit 403 is preferably housed in a plastic case with wires going to the main shut off valve 407. In this embodiment, the base unit 403 is installed as close to the main shut off valve 407 as possible. In another embodiment, the base unit 403 may communicate with the main shut off valve 407 via an RF signal (allowing remote operation) to control the opening or closing of the valve 407.

The base unit 403 may have the ability to identify which of the sender units 400 sent a signal indicating a leak or other condition. The base unit 403 may then process the signal and activate the necessary relays within its circuitry to activate the main shut off valve 407 by use of an electronic internal or external solenoid shut off valve or other motorized driven mechanical shut off devices located inline on the main fluid line 409 and 410 from a fluid source 406. In addition, the base unit 403 may have the ability to reset the main shut off valve 407 once the sender unit 400 has been dried.

An alternative embodiment of this invention could use conductive wires instead of RF frequency devices to send the signal from the sender units 400 to the base unit 403. This would mean that hard wires would need to connect the sender units 400 with the base unit 403 to shut off the main shut off valve 407 to the main fluid source 406. Another embodiment would be using the above described RF sender units 400 to send a signal to an individual water source valves (not shown) within a property such as a water line on a washing machine that could shut off the water flow to that individual hose line by use of a shut off valve, such as an electronic solenoid valve.

Battery/Power

This base unit 403 may plug into a normal 110/120 volt AC standard outlet for main power which will monitor the plurality of sender units 400 for a fluid leak and also activate the main shut off valve 407 to the main fluid source 406. A step down transformer may be used to convert the 110/120 volt AC power to a 12/24 volt AC power supply for additional safety making the unit capable of UL approval. In addition, the base unit 403 will be constructed in such a way as to be compliant for CE or European approval. A battery back-up may be installed in the base unit 403 in case there is a power outage that occurs at the same time as a leak is detected by one or more of the sender units 400.

Base LEDs

The base unit 403 preferably has means for quickly displaying and communicating the status of the system and the sender units 400. Light emitting diodes (LEDs) are an excellent choice for this purpose due to their low power consumption, low cost, long life and high reliability of operation. Various quantities and color combinations of LEDs may be used to indicate various conditions of the system and the sender units 400.

In a preferred embodiment, there is one multicolored LED associated with each of the sender units 400. The LED may emit red to indicate that a sender unit 400 has detected a leak, green to indicate normal operation of the sender unit 400 with no leak, and yellow to indicate a low battery or a test condition for a sender unit 400. This method has been found to be an extremely fast and reliable way for the base unit 403 to accurately communicate the status of each of the sender units 400.

An additional 2 buttons may be available on the base unit 403. The first button may be used to activate the main shut off valve 407, such as an automated electronic solenoid control valve which stops the flow of fluid from the fluid source 406 through the fluid delivery pipes 409 and 410, illustrated in FIG. 4. The second button may be used to reactivate the flow of fluids after the fluid leak has been fixed or for normal maintenance.

Main Shut Off Valve

Figure 3:
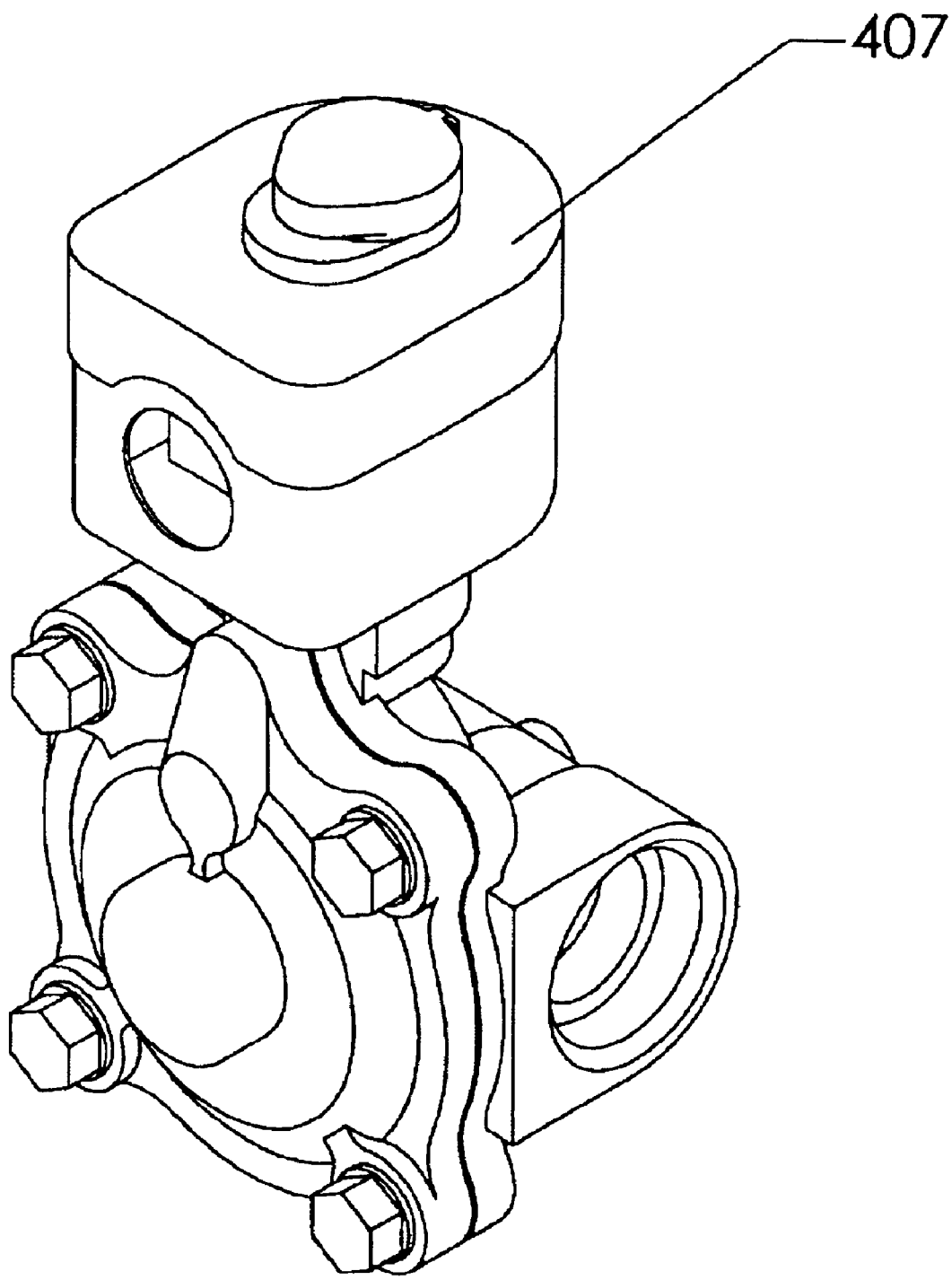
FIG. 3 is a drawing of an automatic shut off valve system.
Figure 4:
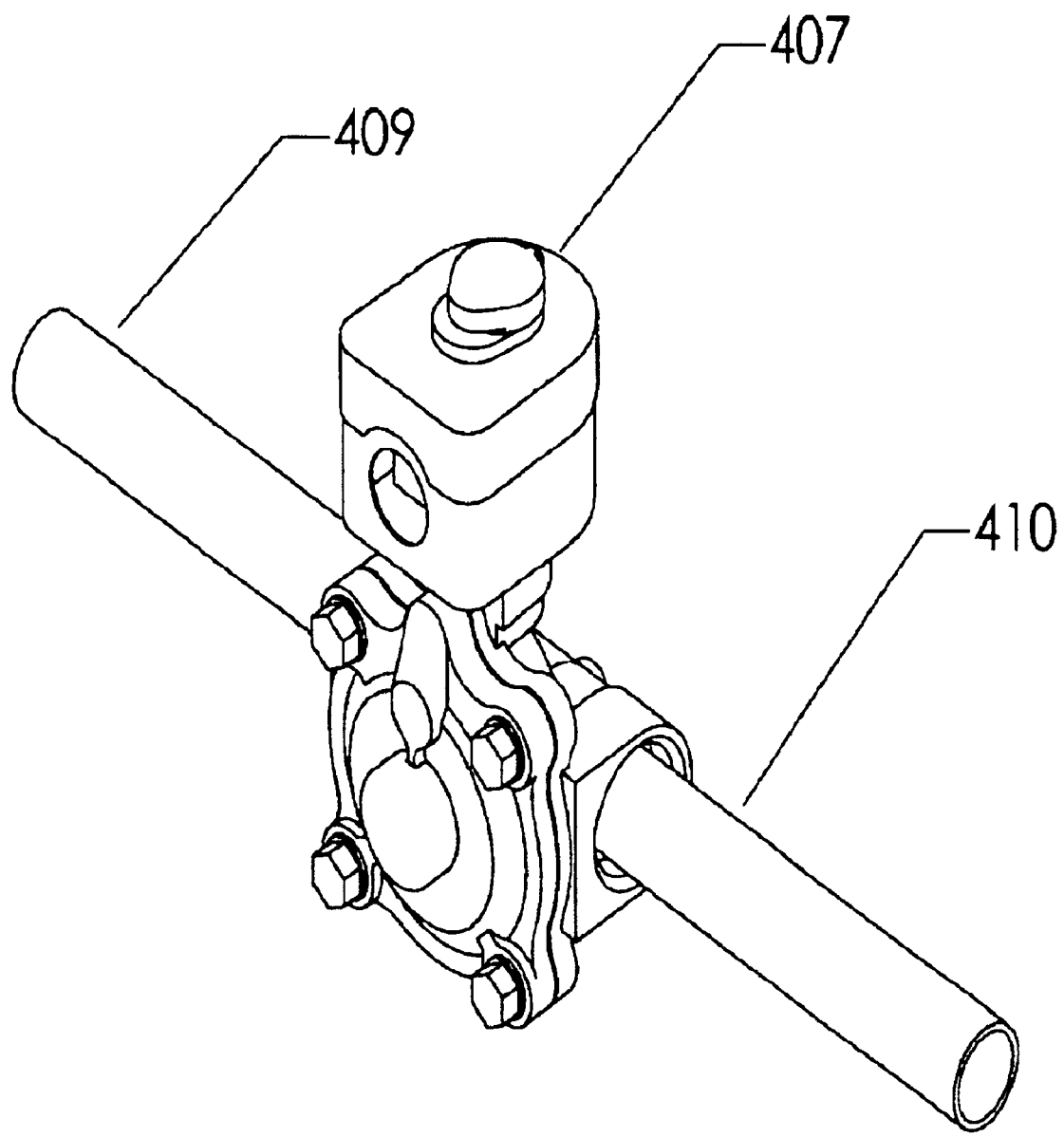
FIG. 4 is a drawing of the automatic shut off valve with an incoming and outgoing fluid delivery lines.

A main shut off valve 407, such as one illustrated in FIG. 3, may be positioned in the fluid delivery pipes 409 and 410, as illustrated in FIG. 4, that deliver fluids from a fluid source 406 to a property 404. The shut off valve 407 may be of any known type, such as an internal or external solenoid or motorized mechanical shut-off device. The shut off valve 407 restricts or stops the flow of fluid to the property 404 thereby reducing or eliminating fluid damage to the property 404.

Gang Installation

Certain properties 404 may be too large or have too many areas where leak detection is desirable for a single base unit 403 and corresponding sender units 400 to cover. For these properties 404 two or more base units 403 and corresponding sender units 400 may be used. In fact, any number of base units 403 and corresponding sender units 400 may be used. Each sender unit 400 may be given a different code or method of identification to assist each base unit 403 in determining if the transmitting sender unit 400 is one of its sender units 400 and, if it is one of its sender units 400, which specific sender unit 400 it is.

In view of the foregoing, it will be understood by those skilled in the art that the systems and processes of the present invention can facilitate the detection and prevention of fluid leaks on a property. The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

What is claimed is:

1. An apparatus for detecting and preventing fluid leaks in a property, comprising:

A) one or more sender units adapted for positioning near a location desirable to detect for a fluid leak;

B) a main shut off valve adapted for restricting delivery of fluids to a property; and C) a base unit in communication with the one or more sender units and the main shut off valve, wherein at least one of the sender units is battery powered and the base unit includes an electronic circuit to detect a power level of a battery in a sender unit.

2. The apparatus in claim 1, wherein at least one sender unit comprises a fluid sensor and a transmitter.

3. The apparatus of claim 2, wherein at least one sensor comprises two electrical contacts for determining the resistance or continuity between the two electrical contacts.

4. The apparatus of claim 2, wherein at least one transmitter communicates with the base unit via an RF signal.

5. The apparatus of claim 1, wherein the base unit communicates with the main shut off valve via an AC electrical signal.

6. The apparatus of claim 1, wherein the base unit further includes a multi colored light emitting diodes to indicate which fluid sensor has a lower battery power level.

7. The apparatus of claim 1, wherein the base unit includes one or more light emitting diodes to indicate which sender unit signaled the base unit that the sender unit had detected a fluid.

8. The apparatus of claim 1, wherein the base unit communicates with the main shut off valve via an AC electrical signal.

9. The apparatus of claim 1, wherein the base unit includes a reset button to allow fluid to flow through the main shut off valve.

10. An apparatus for detecting and preventing fluid leaks in a property, comprising:

A) one or more sender units adapted for remote positioning on a property;

B) a main shut off valve adapted for restricting delivery of fluids to the property; and C) a base unit in communication with the one or more sender units and the main shut off valve, wherein the base unit includes a corresponding multicolored light emitting diode for each sender unit.

11. The apparatus in claim 10, wherein at least one sender unit comprises a fluid sensor and a transmitter.

12. The apparatus of claim 11, wherein at least one sensor comprises two electrical contacts for determining the resistance or continuity between the two electrical contacts.

13. The apparatus of claim 11, wherein at least one transmitter communicates with the base unit via an RF signal.

14. The apparatus of claim 10, wherein the base unit communicates with the main shut off valve via an AC electrical signal.

15. The apparatus of claim 10, wherein at least one sender unit is battery powered.

16. The apparatus of claim 15, wherein the base unit includes an electronic circuit to detect a power level of the battery in the sender unit.

17. The apparatus of claim 10, wherein each multicolored LED is adapted to emit red to indicate that its corresponding sender unit has detected a leak, green to indicate normal operation of its sender unit with no leaks, and yellow to indicate a low battery or a test condition for its sender unit.

* * * * *